(12) United States Patent
Hazra

(10) Patent No.: US 8,689,193 B2
(45) Date of Patent: Apr. 1, 2014

(54) METHOD AND APPARATUS FOR PROTECTING A SOFTWARE APPLICATION AGAINST A VIRUS

(75) Inventor: Amitava Hazra, Holmdel, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 1507 days.

(21) Appl. No.: 11/591,341

(22) Filed: Nov. 1, 2006

(65) Prior Publication Data

US 2008/0148066 A1 Jun. 19, 2008

(51) Int. Cl.
*G06F 9/45* (2006.01)
*G06F 12/14* (2006.01)

(52) U.S. Cl.
USPC ............... 717/140; 717/136; 726/26

(58) Field of Classification Search
None
See application file for complete search history.

(56) References Cited

U.S. PATENT DOCUMENTS

| | | | | |
|---|---|---|---|---|
| 5,546,586 | A * | 8/1996 | Wetmore et al. | 717/122 |
| 5,559,884 | A * | 9/1996 | Davidson et al. | 713/187 |
| 5,784,699 | A * | 7/1998 | McMahon et al. | 711/171 |
| 5,892,899 | A * | 4/1999 | Aucsmith et al. | 726/27 |
| 5,933,845 | A * | 8/1999 | Kopp et al. | 711/103 |
| 6,591,415 | B1 * | 7/2003 | Torrubia-Saez | 717/159 |
| 6,643,775 | B1 * | 11/2003 | Granger et al. | 713/190 |
| 6,668,325 | B1 * | 12/2003 | Collberg et al. | 713/194 |
| 6,907,597 | B1 * | 6/2005 | Mamona et al. | 717/121 |
| 7,152,165 | B1 * | 12/2006 | Maheshwari et al. | 713/193 |
| 7,171,693 | B2 * | 1/2007 | Tucker et al. | 726/26 |
| 7,210,124 | B2 * | 4/2007 | Chan | 717/120 |
| 7,360,252 | B1 * | 4/2008 | Torrubia-Saez | 726/27 |
| 7,383,443 | B2 * | 6/2008 | Zeman et al. | 713/190 |
| 7,430,670 | B1 * | 9/2008 | Horning et al. | 713/190 |
| 7,512,936 | B2 * | 3/2009 | Schneider et al. | 717/136 |
| 7,555,780 | B2 * | 6/2009 | Tucker et al. | 726/26 |
| 7,620,987 | B2 * | 11/2009 | Shelest et al. | 726/22 |
| 2004/0177263 | A1 * | 9/2004 | Sobel et al. | 713/200 |
| 2005/0071653 | A1 * | 3/2005 | de Jong | 713/189 |
| 2005/0097246 | A1 * | 5/2005 | Chen | 710/56 |
| 2007/0039048 | A1 * | 2/2007 | Shelest et al. | 726/22 |
| 2008/0028180 | A1 * | 1/2008 | Newman et al. | 711/206 |

OTHER PUBLICATIONS

Sutter B., "Link-Time Binary Rewriting Techniques for Program Compaction," ACM Transactions on Programming Languages and Systems [online], 2005 [retrieved May 1, 2012], Retrieved from Internet: <http://trappist.elis.ugent.be/~brdsutte/research/publications/2005TOPLASdesutter.pdf>, pp. 882-944.*
PCT Search Report and Written Opinion for PCT/US2007/080820, Aug. 8, 2008, consists of 12 unnumbered pages.
Cohen, F.B., "Operating System Protection Through Program Evolution", Computers and Security, Elsevier Science Publishers, Amsterdam, NL, vol. 12, No. 6, Oct. 1, 1993, pp. 565-584.

* cited by examiner

*Primary Examiner* — Don Wong
*Assistant Examiner* — Todd Aguilera

(57) ABSTRACT

A method and apparatus for protecting computer systems from a virus are disclosed. For example, the present method protects against a class of computer viruses that replicate themselves by making use of the knowledge that a specific piece of software code or data component that always resides at a specific relative memory location in RAM for all instances of the software. In one embodiment, the present method divides a software application into a plurality of components and creates distinct copies of the software application by varying the locations of the components when loaded onto a computer system.

16 Claims, 9 Drawing Sheets

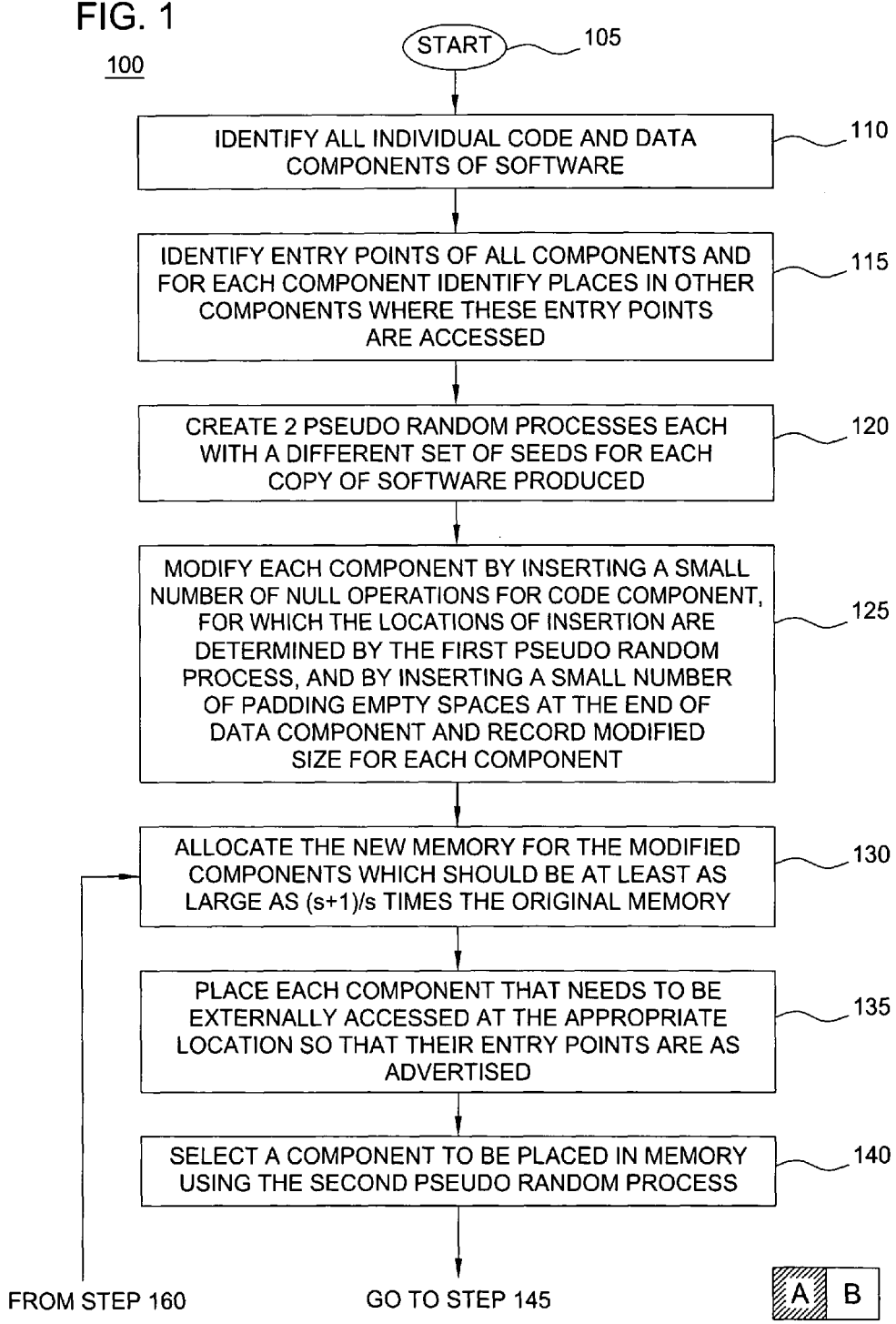

FIG. 1
CONTINUED
100
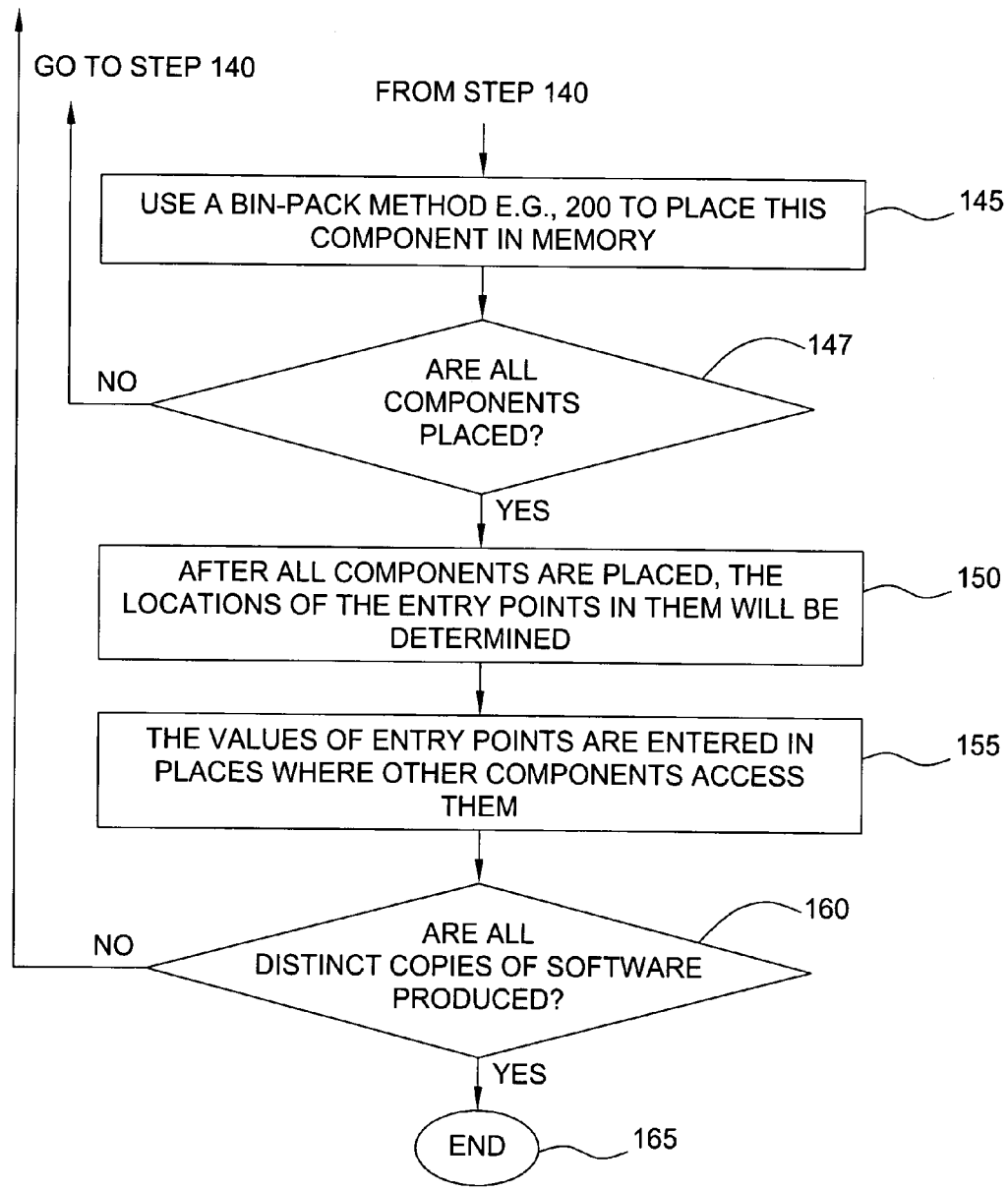

200

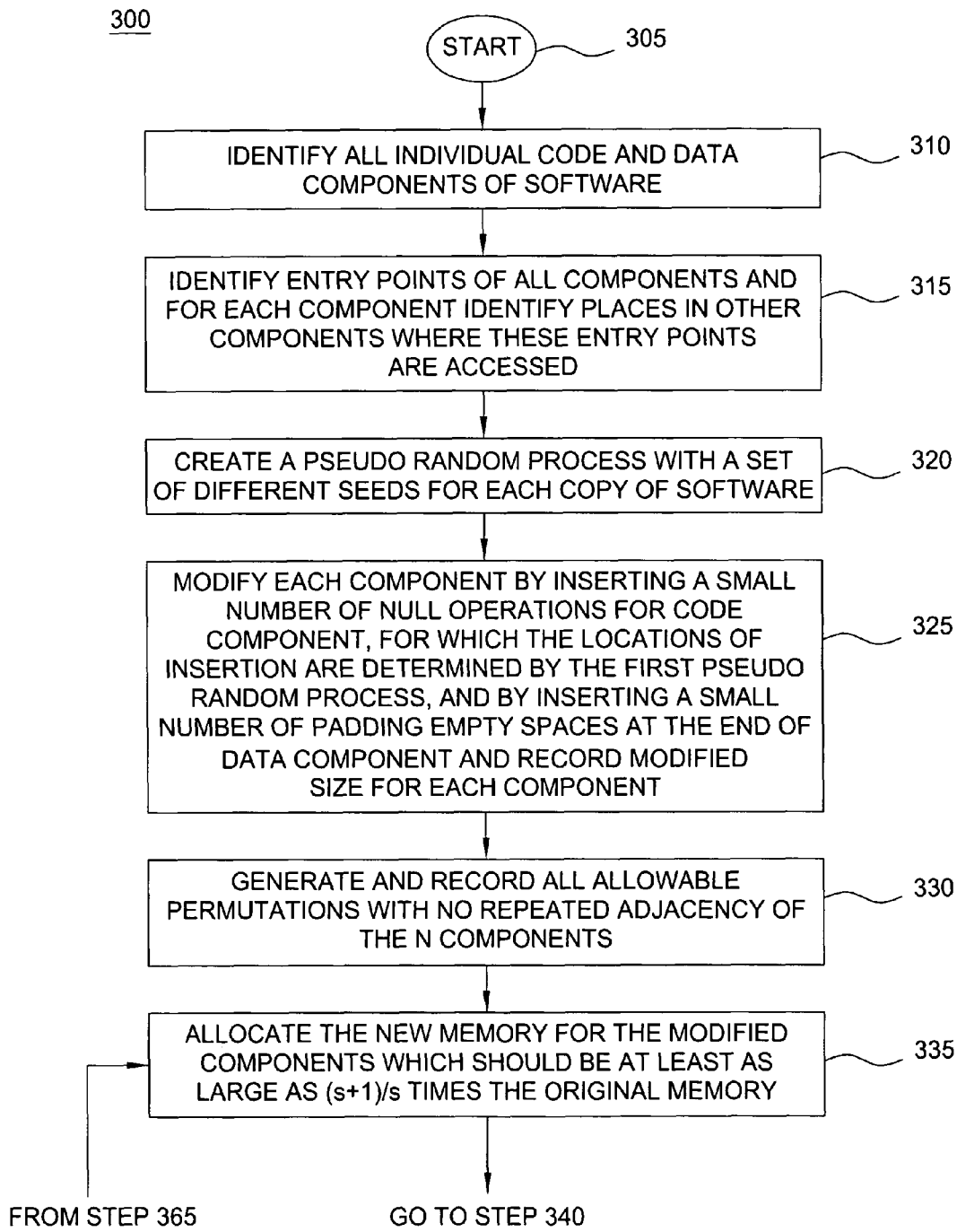

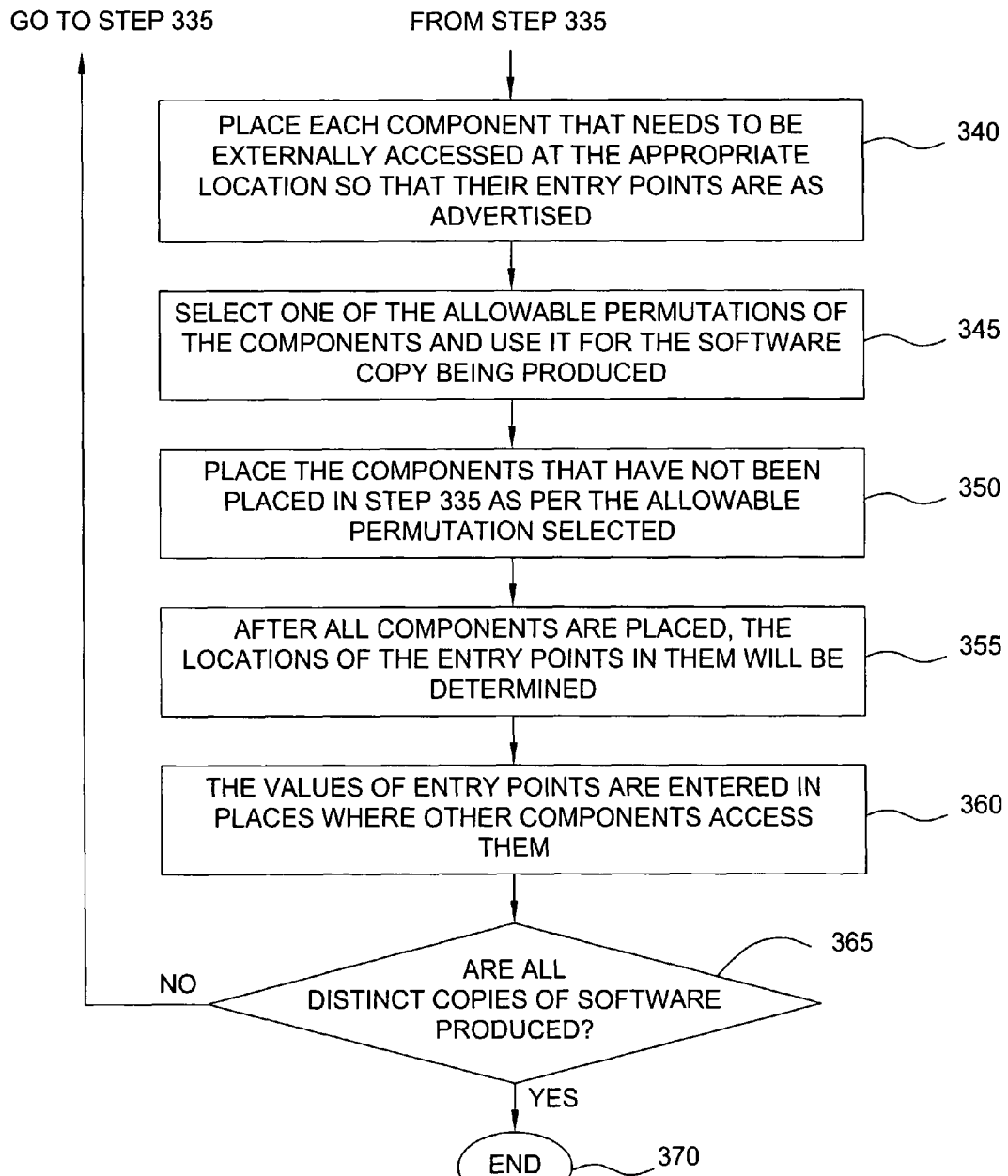

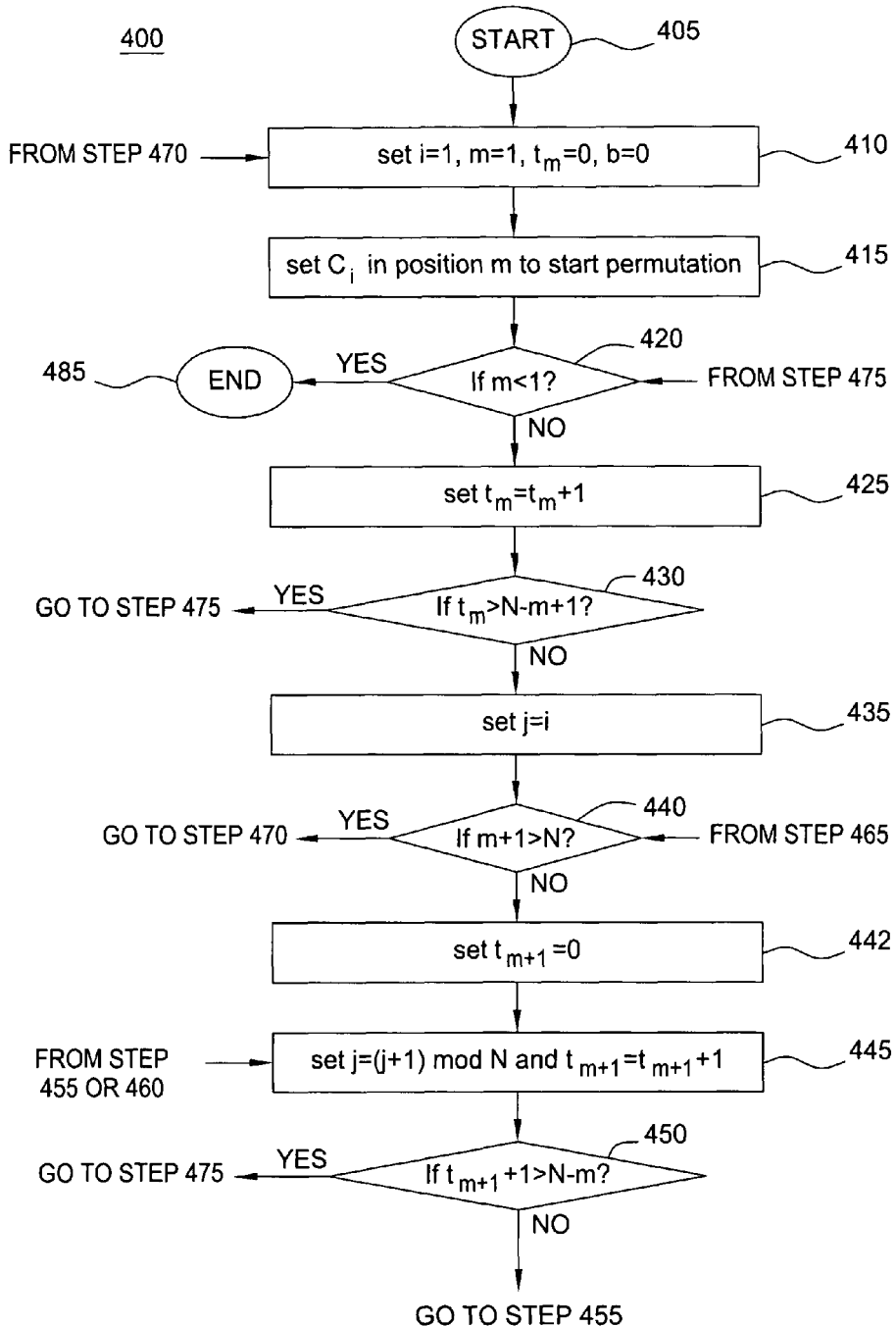

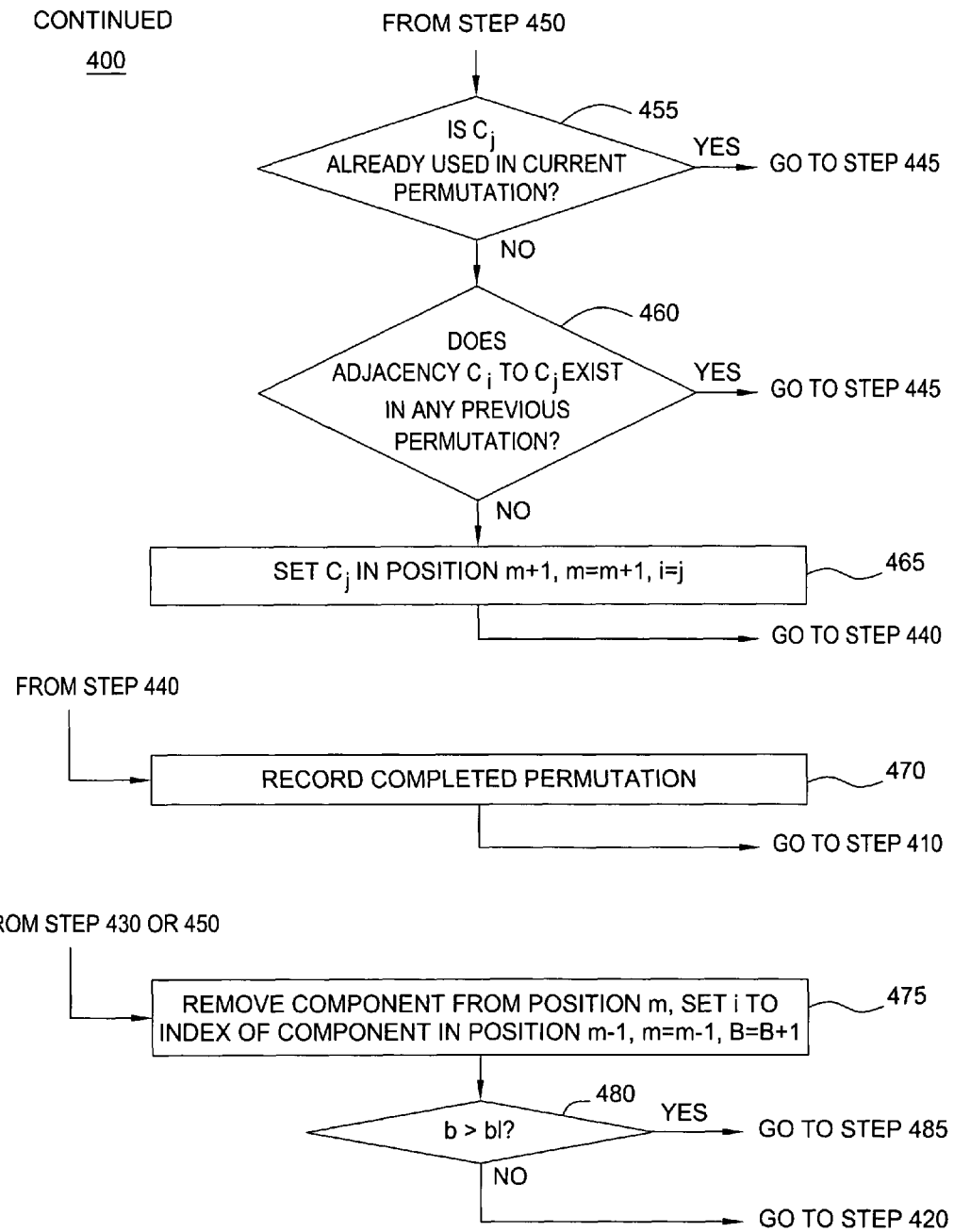

FIG. 5
500
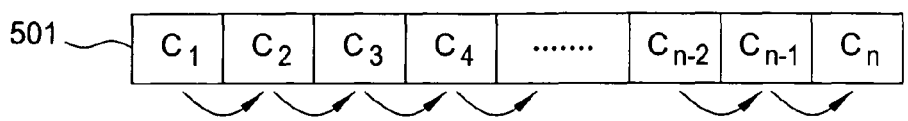
PERMUTATION = $C_1C_2C_3C_4\cdots C_{n-2}C_{n-1}C_n$
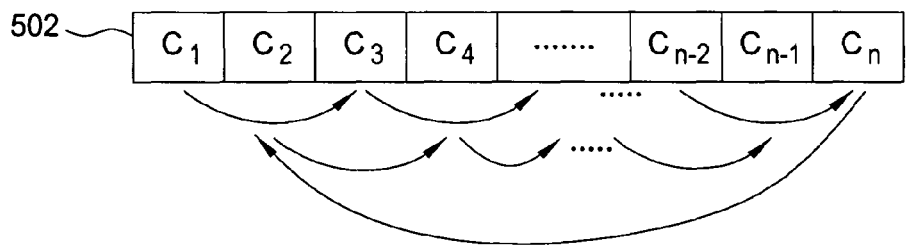
PERMUTATION = $C_1C_3C_5\cdots C_{n-2}C_nC_2C_4\cdots C_{n-1}$
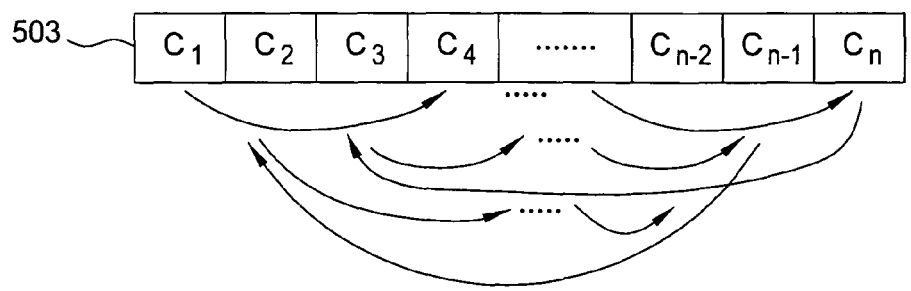
PERMUTATION = $C_1C_4C_7\cdots C_{n-3}C_nC_3C_6C_9\cdots C_{n-4}C_{n-1}C_2C_5C_8\cdots C_{n-5}C_{n-2}$

METHOD AND APPARATUS FOR PROTECTING A SOFTWARE APPLICATION AGAINST A VIRUS

The present invention relates generally to software systems and, more particularly, to a method for protecting a software application against a virus.

BACKGROUND OF THE INVENTION

Computer viruses can replicate themselves by making use of the knowledge that a specific piece of software code or data of application software or system software that always resides in the same relative location in memory for all instances of the software. This particular class of computer viruses often uses this knowledge to compromise a piece of software with known relative memory location in which the software resides in the memory. This is a problem faced by vendors and users of application and system software that do not employ virtual memory. Virtual memory is a method of allowing a computer appears to have more Random Access Memory (RAM) than it actually does. By utilizing available space on a hard disk, the operating system of the computer transparently swaps segments of memory contents between the hard disk and the RAM. Today, many software applications and system software codes are run on computer systems that do not employ the virtual memory method. This type of software is particularly vulnerable to attacks by the aforementioned class of viruses. This class of computer viruses seriously threatens many software applications and system codes that run on Personal Computer (PC), Personal Digital Assistant (PDA), mobile phones, and even switches and routers in the Internet.

Therefore, a need exists for a method for protecting computer systems that do not employ virtual memory against a class of computer viruses.

SUMMARY OF THE INVENTION

In one embodiment, the present invention enables a method for protecting computer systems from a virus. For example, the present method protects against a class of computer viruses that replicate themselves by making use of the knowledge that a specific piece of software code or data component that always resides at a specific relative memory location in RAM for all instances of the software. In one embodiment, the present method divides a software application into a plurality of components and creates distinct copies of the software application by varying the locations of the components when loaded onto a computer system.

BRIEF DESCRIPTION OF THE DRAWINGS

The teaching of the present invention can be readily understood by considering the following detailed description in conjunction with the accompanying drawings, in which:

FIG. 1 illustrates a flowchart of a method for providing protection against a class of virus using randomized locations of software components of the present invention;

FIG. 3 illustrates a flowchart of a method for providing protection against a class of virus using unique adjacency of software components of the present invention;

FIG. 4 illustrates a flowchart of a method for generating permutations of software components without repeated adjacency of the present invention;

FIG. 5 illustrates an example of a method for generating permutations of software components without repeated adjacency when the number of software components is a prime number of the present invention.

To facilitate understanding, identical reference numerals have been used, where possible, to designate identical elements that are common to the figures.

DETAILED DESCRIPTION

Figure 2:
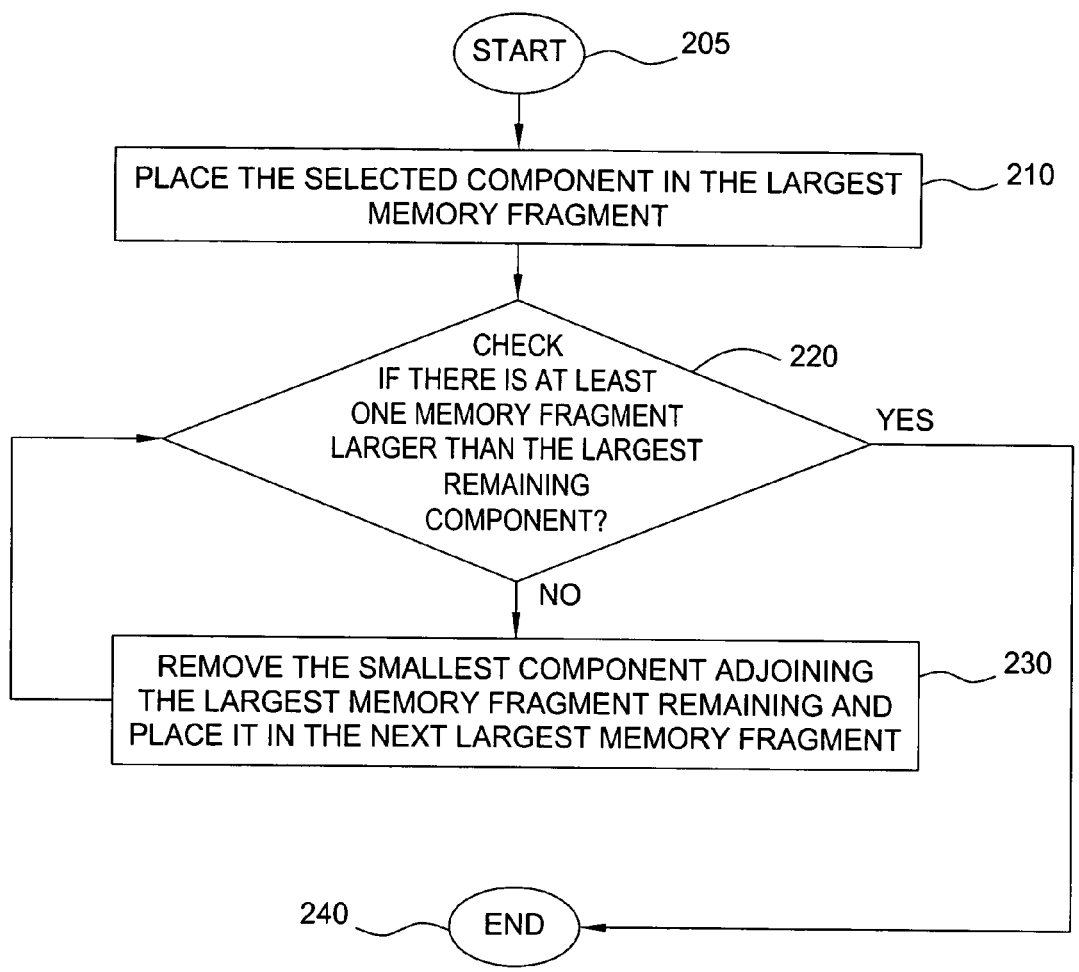
FIG. 2 illustrates a flowchart of a method for bin packing of the present invention.

Computer viruses can replicate themselves by making use of the knowledge that a specific piece of software code or data of application software or system software that always resides in the same relative location in memory for all instances of the software. This particular class of computer viruses often uses this knowledge to compromise a piece of software with known relative memory location in which the software resides in the memory. This is a problem faced by vendors and users of application and system software that do not employ virtual memory. Virtual memory is a method of allowing a computer appears to have more Random Access Memory (RAM) than it actually does. By utilizing available space on a hard disk, the operating system of the computer transparently swaps segments of memory contents between the hard disk and the RAM. Today, many software applications and system software codes are run on computer systems that do not employ the virtual memory method. This type of software is particularly vulnerable to attacks by the aforementioned class of viruses. This class of computer viruses seriously threatens many software applications and system codes that run on Personal Computer (PC), Personal Digital Assistant (PDA), mobile phones, and even switches and routers in the Internet.

To address this criticality, the present invention enables a method for protecting computer systems that do not employ virtual memory against a class of computer viruses that replicate themselves by making use of the knowledge that a specific piece of software code or data component that always resides at a specific relative memory location in RAM for all instances of the software. In one embodiment, the present invention protects computer systems that do not use virtual memory by varying the location of software code and data components in the software from one copy of the software to another. As a result, the same code or data component from a particular piece of software will be loaded in different memory locations in RAM. Since the memory location of a certain software code or data component is loaded in different locations for different copies of the software, a perpetrator may be able to infect, and possibly crash, only a few copies of a piece of software, it is unlikely the same virus can infect a large number of copies of the same software.

Thus, the present invention causes the probability that a virus can replicate itself and propagate through many computers to become exceedingly small. For instance, if there are 500 distinct copies of the same software with software code and data components all loaded in different locations for each copy of the same software, the probability of the virus replicating itself on the first copy it reaches is 1/500. The probability of it being able to propagate by replication to another copy is 1/250,000, i.e. 1/500×1/500. The probability that it can propagate by replication to yet another copy of the software is 1/125,000,000, i.e. 1/500×1/250,000, or one in 125 million. For all practical purposes, it is unlikely that there will be 125 million copies of the same software in existence. Thus, the overwhelming majority of this class of viruses will not be able to propagate beyond a few copies of the same software. This effectively controls the spread of the aforementioned class of viruses to only an extremely small number of computer systems. The present invention focuses not on preventing access but on making virus replication extremely difficult and very unlikely by varying the locations of software code and data components in different copies of the same software.

In order to provide a high degree of protection, there has to be a fairly large number, at least a few hundred, of distinct copies of the same software in that all internal data locations and entry points will be different for each distinct copy. Once a copy of the software is loaded on a system, the entry points of code components and data components will be unknown to other copies of the software running on different systems or even to other copies of the same software running on the same system. There is always some small set of entry points that have to be externally known because they are used for interfacing with other software applications and systems. However, adequate safeguards can be typically built in at the entry points designated for external access. The ability of viruses to replicate themselves depends on the unauthorized back-door access to compromise a piece of software on a software system. This is the kind of access that can be blocked by the present invention. The present invention is different from typical virus protection methods because it applies to a general class of computer viruses that exploit known memory location of code and/or data components of a software application to compromise a computer system.

In contrast, most existing virus prevention methods focus on preventing attacks by specific known viruses. Once the profile of the virus is understood, an anti-virus for the specific virus is developed and provided to users of the software. So there is a constantly growing compendium of known viruses and their anti-viruses. This existing virus prevention approach is a reactive approach and really offers no protection against future viruses. Furthermore, for viruses that mutate as well as for viruses that remain dormant, the existing approach is not very effective. Widespread infections may occur before the virus makes itself known. Large organizations have to have teams of virus experts constantly on the outlook for new viruses that have either made themselves known or are actively and silently spreading but have not made themselves known.

One aspect of the present invention is to keep the functionality of each copy of the software identical, but to change the internal structure sufficiently from one copy to another so that the methods of virus replication are rendered useless. The first part of the present invention is to divide the software into multiple code and data components. For example, there should be at least several dozen components to increase the effectiveness of the present invention. The present invention is to prevent unauthorized access and to allow legitimate access into a component. Unauthorized access can happen if the virus knows the location of the component. So if the location is made to vary from copy to copy, any knowledge the virus has is useless. There is also a special case often used by viruses where the virus may only know that a specific component, say B, is adjacent to another component, say A. Thus, a legitimate access to A can be turned into an unauthorized access to B.

The broad approach of the present invention can be implemented in three different embodiments:

i) The use of slight variation in the length of the various software components from copy to copy. For example, a search routine which is part of a piece of system software will not be exactly the same length in different copies of the system software. For data components it is easy to introduce such variations by providing differing amounts of padding empty space at the end of a data component. All components that access the data component within the same copy of the software of course need to know the exact location where the actual data starts. For code components the variation can be accomplished by inserting a small number of null operation, e.g., NO OPS, instructions in the code. A small number, say 1% to 2% of the total number of commands in the code, will neither impact the performance perceptibly nor increase the size of the software significantly. However, it will effectively prevent replication of all viruses that depend on knowing the exact size of various components of the system software. The null operations can be introduced at the end of component to reduce compiler complications and at the same time the compilation should be done with certain optimization features, such as dead code elimination, turned off. To avoid memory size limitation issues, the software can be initially compiled and linked with null operations introduced into all the components and the data components at their maximum size so that all components are at their maximum size. Subsequent distinct copies of the same software created by modification will drop some of the null operations and some of the padding spaces in the data components at random as indicated in methods 100 and 300 described below.

ii) The use of randomized location for each component. This can be accomplished by using a pseudo random number generation process to determine where each software component should be loaded as indicated in method 100 hereafter. There is one restriction on relocating the components. The components that are externally accessed, i.e. have an external entry point, must be placed so that the external entry point remains at the same location. Otherwise external access will not work properly.

iii) The use of unique adjacency by ensuring an adjacency of software components occurs only in one copy of the software. Thus, if component A immediately precedes component B in one copy of the software, there should be no other copy of the software in which A would immediately precede B. Each copy will be distinct in terms of the adjacencies they have. If the number of components is N, the number of arrangements that are unique in this sense is approximately N as shown in method 300 hereafter.

Furthermore, the three embodiments can be combined to form different effective methods for virus protection for computer systems that do not use virtual memory. For example, embodiment i, the use of variation in length of components, can be combined with embodiment ii, the use of randomized location of the components, as described in method 100. Similarly embodiment i, the use of variation in length of components, can also be combined with embodiment iii, the use of unique adjacency of components, as described in method 300.

FIG. 1 illustrates a flowchart of a method 100 for providing protection against a virus using randomized locations of software components of the present invention. Method 100 starts in step 105 and proceeds to step 110.

In step 110, the method 100 identifies all individual code and data components of a software application or system software.

In step 115, the method 100 identifies entry points of all components and for each component identifies places in other components where these entry points are accessed.

In step 120, the method 100 creates two pseudo random processes each with a different set of seeds for each copy of software produced.

In step 125, the method 100 modifies each software code component by inserting a small number of null operations, for which the locations of insertion are determined by the first pseudo random process. In addition, for each software data component, a small number of padding empty spaces are added at the end as well. The method also records the size of each modified component. Note that after such insertions of null operation instructions and padding empty spaces, these modified components form the building blocks from which distinct copies of the same software, i.e. with the same functionality, will be created.

In step 130, the method 100 allocates the new memory for the modified components which should be at least as large as $(s+1)/s$ times the original memory size of the unmodified components, where $1/s$ is the largest fractional increase among the modified components. This is the first step of the creation of each distinct copy of the same software.

In step 135, the method 100 places each component that needs to be externally accessed at the appropriate location so that their entry points are as advertised. Preferably there should be only one such component which can have all the external entry points. This will lead to minimal fragmentation of memory.

In step 140, the method 100 selects a component to be placed in memory using the second pseudo random process.

In step 145, the method 100 uses a bin-packing method, e.g., method 200 of FIG. 2, to place this component in memory. If there are N components that need to be externally accessed, then there are N+1 fragmented spaces at most. So at any point, there are at most 2(N+1) choices for placing the selected component in memory at either end of the fragmented spaces. The bin-packing method will use heuristics to determine the best choice.

In step 147, the method 100 determines whether all components are placed. If the query is affirmatively answered, then method 100 proceeds to step 150. If the query is negatively answered, then method 100 proceeds to step 140.

In step 150, after all components are placed, the method 100 determines the locations of the entry points in all components.

In step 155, the method 100 enters in the appropriate places the values of entry points where other components access them.

In step 160, the method 100 checks if all distinct copies of the same software have been produced. If all distinct copies of the same software have been produced, the method proceeds to step 165; otherwise, the method proceeds back to step 130. The method ends in step 165.

FIG. 2 illustrates a flowchart of a method 200 for bin-packing of the present invention. Method 200 starts in step 205 and proceeds to step 210.

In step 210, the method places the selected component in the largest memory fragment.

In step 220, the method checks if there is at least one memory fragment larger than the largest remaining component. If there is at least one memory fragment larger than the largest remaining component, the method proceeds to step 240; otherwise, the method proceeds to step 230.

In step 230, the method removes the smallest component adjoining the largest memory fragment remaining and places it in the next largest memory fragment. The method ends in step 240.

It should be noted that it can be proven that the method 200 is effective, i.e. it will always terminate. This is because the memory is no more fragmented for the modified software than it was for the original software. This is true because the positions of the external entry points have remained the same and the components were at their maximum size in the original software.

FIG. 3 illustrates a flowchart of a method 300 for providing protection against a virus using unique adjacency of software components of the present invention. This method focuses on ensuring that no two copies of the software have the same components adjacent to each other in the same way. Thus, if the software has 3 components A, B, C, then two possible copies that meet this condition are ABC and CBA. Each of the patterns AB, BC, CB and BA appear only in one of the two arrangements. Note that two of the possible patterns AC and CA don't appear because it is not possible to make a third arrangement using those patterns. In general, if there are N components in the software then the number of such distinct copies or arrangements is either N or N−1 depending on the value of N. If N is a prime number then generating the arrangements to meet this criterion is quite straightforward as shown below in FIG. 5. Method 300 is similar to method 100 and the key difference is that instead of random placement of software code and data components, the components are placed in arrangements such that no two arrangements have the same two components adjacent in the same way. Method 300 starts in step 305 and proceeds to step 310.

In step 310, the method 300 identifies all individual code and data components of the system software.

In step 315, the method 300 identifies entry points of all components and for each component identifies places in other components where these entry points are accessed.

In step 320, the method 300 creates a pseudo random process.

In step 325, the method 300 modifies each software code component by inserting a small number of null operation instructions, for which the locations of insertion are determined by the first pseudo random process. In addition, for each software data component, a small number of padding empty spaces are added at the end as well. The method also records the size of each modified component. Note that after such insertions of null operation instructions and padding empty spaces, these modified components are the building blocks from which distinct copies of the same software, i.e. with the same functionality, will be created.

In step 330, the method 300 generates and records all allowable permutations with no repeated adjacency of the N components using method 400 as discussed in FIG. 4 in one embodiment.

In step 335, the method 300 allocates the new memory for the modified components which should be at least as large as $(s+1)/s$ times the original memory, where $1/s$ is the largest fractional increase among the modified components. This is the first step of the creation of each distinct copy of the same software.

In step 340, the method 300 places each component that needs to be externally accessed at the appropriate location so that their entry points are as advertised. Preferably there should be only one such component which can have all the external entry points. Then there is minimal fragmentation of memory. This will lead to minimal fragmentation of memory.

In step 345, the method 300 selects one of the allowable permutations of the components and uses it for the software copy being produced. A method for generating allowable permutations is described in method 400 of FIG. 4.

In step 350, the method 300 places the components that have not already been placed in step 345 as per the allowable permutation selected.

In step 355, the method 300, after all components have been placed, determines the locations of the entry points in all components.

In step 360, the method 300 enters in the appropriate places the values of entry points where other components access them.

In step 365, the method 300 checks if all distinct copies of the same software have been produced. If all distinct copies of the same software have been produced, the method proceeds to step 370; otherwise, the method proceeds back to step 335. The method ends in step 370.

FIG. 4 illustrates a flowchart of a method 400 for generating permutations of software components without repeated adjacency of the present invention. Method 400 is a non recursive method that uses backtracking. However, several concerns have to be addressed first. It is important to incorporate some efficiency heuristics, especially when the number of components is not trivially small. One such heuristic is starting each new permutation with the component that was in the last position in the previous permutation now placed in the first position. In addition, it is good to have some limits placed on the amount of backtracking to be done. Although the total number of possible permutations for N components is N−1, a large amount of backtracking may be needed to generate the last few permutations. So if we don't try to compute the last few possible permutations, which will take a large amount of time to compute, we will still have approximately N permutations available that will be adequate for all practical purposes.

Additionally, method 400 has assumed that none of the components are fixed, i.e. they do not necessarily have to be in the same location in all permutations. However, as can be seen in methods 100 and 300, there may be some components which will have to be at fixed locations because the entry points in them are externally advertised. Therefore, the results of the method 400 need to be processed in that the number of allowable permutations has to be further pruned to make sure that they are consistent with externally advertised components being in fixed locations. As noted earlier, if the number of such components is limited to a single one, the additional pruning is minimal.

Method 400 incorporates an efficiency heuristics and a cutoff limit for the number of backtracks beyond which no more permutations will be computed. Given N is the number of components, with components $C_1, C_2, \ldots,$ and $C_N$, a value, bl, for limit on the number of backtracks to be tried is chosen to limit computation time. Method 400 starts in step 405 and proceeds to step 410.

In step 410, the method sets i to 1, m to 1, $t_m$ to 0 and the number of backtracks, b, to 0.

In step 415, the method sets $C_i$ in position m to start current permutation.

In step 420, the method checks if m<1. If m is smaller than 1, the method proceeds to step 485 and terminates with no further permutations possible without repeating adjacencies; otherwise, the method proceeds to step 425.

In step 425, the method set $t_m=t_m+1$.

In step 430, the method checks if $t_m$ exceeds N−m+1. If $t_m$ exceeds N−m+1, then all remaining components have been tried in this position without generating a complete permutation and the method proceeds to step 475 for backtracking; otherwise, the method proceeds to step 435.

In step 435, the method sets j to i.

In step 440, the method checks if m+1 exceeds N. If m+1 exceeds N, then this permutation is completed and terminated with success and the method proceeds to step 470; otherwise, the method proceeds to step 442.

In step 442, the method sets the number of tries $t_{m+1}=0$.

In step 445, the method sets j=(j+1)mod N and set $t_{m+1}=t_{m+1}+1$.

In step 450, the method checks if the number of tries $t_{m+1}+1$ exceeds N−m. If $t_{m+1}+1$ exceeds N−m, then all remaining components have been tried without success and the method proceeds to step 475 to backtrack; otherwise, the method proceeds to step 455.

In step 455, the method checks if $C_j$ is already used in current permutation. If $C_j$ is already used, the method proceeds to step 445; otherwise, the method proceeds to step 460.

In step 460, the method checks if the adjacency $C_i$ with Cj does not already exist in any previous permutation. If the adjacency $C_i$ with Cj does not already exist in any previous permutation, the method proceeds to step 465; otherwise, the method proceeds to step 445.

In step 465, the method sets $C_j$ in position m+1, sets m to m+1, sets i to j and then proceeds back to step 440.

In step 470, the method records completed permutation, set i to the index of component in position N of this permutation and then proceeds back to step 410 to generate the next permutation.

In step 475, the method removes component from position m, set i to the index of component in position m−1, sets m=m−1, and sets b=b+1 and then proceeds to step 480.

In step 480, the method checks if b exceeds the limit on the number of backtracks, bl. If b exceeds the limit, bl, the method terminates with further permutations too expensive to be generated and proceeds to step 485; otherwise, the method proceeds back to step 420.

FIG. 5 illustrates an example of a method 500 for generating permutations of software components without repeated adjacency when the number of software components is a prime number of the present invention.

In FIG. 5, there are n software components in total. In permutation 501, the first permutation $C_1 C_2\ C_3 C_4 \ldots C_{n-2}\ C_{n-1}\ C_n$ is generated. In permutation 502, the second permutation $C_1 C_3 C_5 \ldots C_{n-2}\ C_n\ C_2 C_4 \ldots C_{n-1}$ is generated by skipping one component at a time and continuing by wrapping around at the end of the component sequence. In permutation 503, the third permutation $C_1 C_4 C_7 \ldots C_{n-3}\ C_n\ C_3 C_6\ C_9 \ldots C_{n-4}\ C_{n-1}\ C_2 C_5 C_8 \ldots C_{n-5}\ C_{n-2}$ is generated by skipping two components at a time and continuing by wrapping around at the end of the component sequence. Similarly, the fourth, the fifth, and up to the $(n-1)^{th}$ permutation can be generated by skipping four, five, and n components, respectively, at a time and continuing by wrapping around at the end of the component sequence.

Furthermore, while spamming itself does not depend on penetration and compromising of other systems, spamming that disguises its source does depend on such penetration. Spammers who are the source of the most serious spamming problems almost invariably engage in such disguise. Disguising the source is done by:

penetrating systems not owned by the spammer and making them as apparent sources of spam; and penetrating of high capacity servers such as mail servers which offer higher capability for distributing spam.

The general protection against penetration afforded by methods 100 and 300 described above may be adequate for relatively low end systems which may not be very attractive targets for disguising spamming because of their limited capability. But high end servers which are attractive targets are likely to be probed and attacked frequently and need additional protection. One technique is to provide multiple versions of unique copies of the same software to such servers. In their maintenance windows, these copies of software can be switched from one version to another. This will make it much harder to probe and attack them because the version will keep changing. Therefore, any knowledge the attacker may gain by repeated probing will be useless once the version changes and the attacker will have to begin again.

Figure 6:
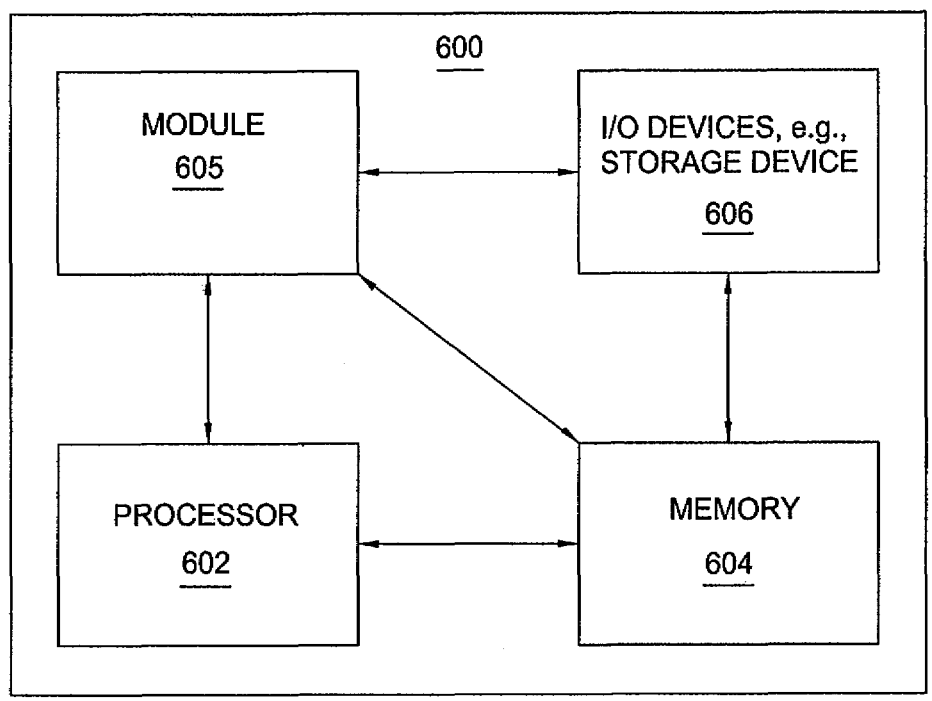
FIG. 6 illustrates a high level block diagram of a general purpose computer suitable for use in performing the functions described herein.

FIG. 6 depicts a high level block diagram of a general purpose computer suitable for use in performing the functions described herein. As depicted in FIG. 6, the system 600 comprises a processor element 602 (e.g., a CPU), a memory 604, e.g., random access memory (RAM) and/or read only memory (ROM), a virus protection module 605, and various input/output devices 606 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present virus protection module or process 605 can be loaded into memory 604 and executed by processor 602 to implement the functions as discussed above. As such, the present virus protection process 605 (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for protecting a software application, comprising:
dividing, by a processor, the software application into a plurality of components, wherein the dividing comprises:
identifying code components within the software application;
identifying data components within the software application; and
identifying an entry point for each of the code components and the data components;
creating, by the processor, distinct copies of the software application by varying locations of the plurality of components when loaded onto a computer system for each distinct copy of the software application, wherein the locations are memory locations of the computer system, wherein components that need to be externally accessed are placed at advertised locations where the entry points to the components that need to be externally accessed do not vary;
compiling, by the processor, a copy of the software application having null operations and padding spaces added to the plurality of components where all of the plurality of components are at a maximum size; and
creating, by the processor, subsequent distinct copies of the software application by dropping at random a portion of the null operations and padding spaces that were added for each one of the distinct copies of the software application.

2. The method of claim 1, wherein the identifying the code components comprises:
modifying each of the identified code components by inserting a number of the null operations;
determining a location of insertion for each of the null operations by using a first pseudo random number generation process; and
recording a size of each of the modified code components.

3. The method of claim 2, wherein the first pseudo random number generation process uses a different random number generation seed for each of the distinct copies of the software application.

4. The method of claim 1, wherein the identifying the data components comprises:
modifying each of the data components; and
recording a size of each of the modified data components.

5. The method of claim 1, wherein the creating comprises:
randomly selecting the locations for the plurality of components; or
selecting the locations for the plurality of components based on unique adjacency of the plurality of components.

6. The method of claim 5, wherein the randomly selecting the locations for the plurality of components comprises:
selecting one of the plurality of components for placement using a second random number generation process; and
placing the selected component using a bin-packing method.

7. The method of claim 6, wherein the second random number generation process uses a different random number generation seed for each of the distinct copies of the software application.

8. The method of claim 6, wherein the bin-packing method comprises:
placing the selected one of the plurality of components in a largest memory fragment;
checking if there is a memory fragment that is larger than a largest remaining component to be placed;
removing a smallest component adjoining the largest memory fragment remaining and placing it in a next largest memory fragment if there is no memory fragment larger than the largest remaining component to be placed; and
terminating the bin-packing method if there is a memory fragment larger than the largest remaining component to be placed.

9. The method of claim 5, wherein the unique adjacency of the plurality of components comprises:
selecting one of a plurality of unique adjacency permutations of the plurality of components generated by an adjacency generation method; and
placing each of the plurality of components using the selected one of the plurality of unique adjacency permutations.

10. The method of claim 9, wherein the adjacency generation method produces the plurality of unique adjacency permutations with no repeated software component adjacency in all of the plurality of unique adjacency permutations.

11. The method of claim 9, wherein the one of the plurality of unique adjacency permutations that is selected comprises a non-recursive method that uses backtracking, wherein given N number of components of $C_1$ to $C_N$, a value b representing a number of backtracks, the one of the plurality of unique adjacency permutations that is selected comprising:

setting i=1, where i is a first component index value, m to 1, where m is a position variable, $t_m$ to 0 and a number of backtracks b to 0, wherein $t_m$ represents a number of tries;

setting $C_i$ in position m to start a current permutation;

checking if m<1;

when m>1, setting $t_m=t_m+1$ checking if $t_m$>N−m+1;

when $t_m$<N−m+1, setting j=i, where j comprises a second component index value;

checking if m+1>N;

when m+1<N, setting $t_{m+1}$=0;

setting j=(j+1) mod N and setting $t_{m+1}=t_{m+1}+1$ checking if $t_{m+1}+1$>N−m;

when $t_{m+1}+1$<N−m, checking if $C_j$ is already used in the current permutation;

when $C_j$ is not already used, checking if an adjacency $C_i$ with $C_j$ does not already exist in any previous permutation;

when the adjacency of $C_i$ with $C_j$ does not already exist setting $C_j$ in position m+1, setting m to m+1 and setting i to j;

recording a completed permutation;

setting i to an index value of a component in position N of the completed permutation;

removing a component from position m, setting i to the index of the component in position m−1, setting m=m−1 and setting b=b+1; and terminating the current permutation when b exceeds a limit on the number of backtracks.

12. The method of claim 9, wherein the one of the plurality of unique adjacency permutations that is selected comprises given a first permutation, generating a subsequent permutation by skipping n number of components for an $(n-1)^{th}$ permutation and continuing by wrapping around at an end of a component sequence.

13. A non-transitory computer-readable medium storing a plurality of instructions which, when executed by a processor, cause the processor to perform operations for protecting a software application, the operations comprising:

dividing the software application into a plurality of components, wherein the dividing comprises:
identifying code components within the software application;
identifying data components within the software application; and
identifying an entry point for each of the code components and the data components;

creating distinct copies of the software application by varying locations of the plurality of components when loaded onto a computer system for each distinct copy of the software application, wherein the locations are memory locations of the computer system, wherein components that need to be externally accessed are placed at advertised locations where the entry points to the components that need to be externally accessed do not vary;

compiling a copy of the software application having null operations and padding spaces added to the plurality of components where all of the plurality of components are at a maximum size; and creating subsequent distinct copies of the software application by dropping at random a portion of the null operations and padding spaces that were added for each one of the distinct copies of the software application.

14. The non-transitory computer-readable medium of claim 13, wherein the identifying the code components comprises:

modifying each of the identified code components by inserting a number of the null operations;

determining a location of insertion for each of the null operations by using a first pseudo random number generation process; and recording a size of each of the modified code components.

15. The non-transitory computer-readable medium of claim 14, wherein the first pseudo random number generation process uses a different random number generation seed for each of the distinct copies of the software application.

16. An apparatus for protecting a software application, comprising:

a processor; and a computer-readable medium storing a plurality of instructions which, when executed by the processor, cause the processor to perform operations, the operations comprising:

dividing the software application into a plurality of components, wherein the dividing comprises:
identifying code components within the software application;
identifying data components within the software application; and
identifying an entry point for each of the code components and the data components;

creating distinct copies of the software application by varying locations of the plurality of components when loaded onto a computer system for each distinct copy of the software application, wherein the locations are memory locations of the computer system, wherein components that need to be externally accessed are placed at advertised locations where the entry points to the components that need to be externally accessed do not vary;

compiling a copy of the software application having null operations and padding spaces added to the plurality of components where all of the plurality of components are at a maximum size; and creating subsequent distinct copies of the software application by dropping at random a portion of the null operations and padding spaces that were added for each one of the distinct copies of the software application.

* * * * *